(12) United States Patent
Pedersen et al.

(10) Patent No.: US 6,433,926 B2
(45) Date of Patent: Aug. 13, 2002

(54) OPTICAL AMPLIFIER AND A METHOD OF PREVENTING EMISSION THEREFROM OF OPTICAL POWER EXCEEDING A PRESCRIBED SAFETY LIMIT

(75) Inventors: Claus F. Pedersen, Frederiksberg; Søren M. Nielsen, Hvalsø, both of (DK)

(73) Assignee: DSC Communications A/S (DK)

(*) Notice: Subject to any disclaimer, the term of this patent is extended or adjusted under 35 U.S.C. 154(b) by 0 days.

(21) Appl. No.: 09/865,140

(22) Filed: May 24, 2001

Related U.S. Application Data

(63) Continuation of application No. 09/308,342, filed on Nov. 14, 1997, now Pat. No. 6,243,195.

(30) Foreign Application Priority Data

Nov. 14, 1997 (WO) .............................. PCT/DK97/00518

(51) Int. Cl.[7] .................................................. H01S 3/00
(52) U.S. Cl. .............................. 359/341.43; 359/341.44
(58) Field of Search ......................... 359/341.43, 341.44

(56) References Cited

U.S. PATENT DOCUMENTS

| | | |
|---|---|---|
| 5,428,471 A | 6/1995 | McDermott |
| 5,581,397 A | 12/1996 | Maki et al. |
| 5,680,246 A * | 10/1997 | Takahashi et al. ........... 359/341 |
| 5,923,463 A * | 7/1999 | Hamada ..................... 359/341 |
| 5,930,030 A | 7/1999 | Scifres |

FOREIGN PATENT DOCUMENTS

| | | |
|---|---|---|
| FR | 2693564 | 6/1993 |
| WO | 9635935 | 11/1996 |

* cited by examiner

*Primary Examiner*—Mark Hellner
(74) *Attorney, Agent, or Firm*—Baker Botts L.L.P.

(57) ABSTRACT

An optical amplifier comprises an active fiber (1) a pump unit (2) spaced from the active fiber and adapted to give a nominal, continuous pump power in an operational state, and a pump fiber (3) adapted to transfer optical pump power from the pump unit (2) to the active fiber (1). Moreover, in a safety state, the pump unit (2) is adapted to give a pulsed pump power whose mean power is lower than a prescribed safety limit.

A method of preventing emission of optical power exceeding a prescribed safety limit on interruption of an optical fiber (3) which transfers pump power from a pump unit (2) to an active fiber (1), comprises changing the mean power of the pump power in response to a signal received from the active fiber (1) so that the mean power assumes a value below said safety limit if said signal is not received, and assumes a nominal value if said signal is received.

20 Claims, 2 Drawing Sheets

OPTICAL AMPLIFIER AND A METHOD OF PREVENTING EMISSION THEREFROM OF OPTICAL POWER EXCEEDING A PRESCRIBED SAFETY LIMIT

RELATED APPLICATION

This application is a continuation of U.S. Ser. No. 09/308,342 filed Nov. 14, 1997 now U.S. Pat. No. 6,243,195, which claims the priority of PCT/DK97/00518 filed Nov. 14, 1997.

TECHNICAL FIELD OF THE INVENTION

The invention relates to an optical amplifier comprising an active fiber, a pump unit spaced from the active fiber and adapted to give a nominal, continuous pump power in an operational state, and a pump fiber adapted to transfer pump power from the pump unit to the active fiber.

The invention moreover relates to a method of preventing emission of optical power exceeding a prescribed safety limit upon interruption of an optical fiber which transfers pump power from a pump unit to an active fiber.

BACKGROUND OF THE INVENTION

Optical fiber amplifiers for amplifying optical signals typically consist of a length of active fiber, which may e.g. be an erbium-doped fiber, and a unit for generating pump power, e.g. a pump laser. When the active fiber is pumped with a strong optical signal (the pump signal) having a wavelength range different from that of the signal to be amplified, and a communications signal is launched into the amplifier, a signal coherent with the signal on the input will occur on the output of the active fiber. The gain is determined i.e. by the power of the pump signal.

The active fiber may be arranged at a considerable distance (e.g. 10–50 km) from the pump laser, in which case the amplifiers are referred to as remote-pumped amplifiers. With e.g. remote-pumped preamplifiers, also called RILP (Remote In-Line Preamplifier), the active fiber is thus spaced from the actual receiver of the optical signals, and it is pumped from the receiver. This takes place via an optical fiber, typically, but not necessarily, the same fiber as transmits the communications signals from the active fiber to the receiver.

The light transmitted in such fibers, in the form of communications signals or pump power, is typically harmful to the human eye. Therefore, because of situations with access to fiber ends or non-connected connectors, it is prescribed by various standards how much optical power may be transmitted from an open fiber end in these situations. These situations may e.g. occur in case of repair, maintenance and testing of systems, or when a fiber has broken, or a connector is disassembled. It is the temporal mean power of the light that is harmful to the eye.

To achieve the desired function of a remote-pumped amplifier, it is necessary to emit levels of pump power in the fiber from the pump laser which significantly exceed the mentioned safety limits. To comply with the safety standards, it is therefore necessary to reduce the pump power in the event that the fiber transmitting the pump power is interrupted between the pump laser and the active fiber.

Further various communications equipment standards prescribe that the equipment must be capable of automatically resuming normal operation when the transmission path has been re-established after a break and transmission signals are transmitted again. For remote-pumped amplifiers, such as e.g. RILP, this requirement, however, is not easy to satisfy, as the reduced pump power results in a considerable reduction in the gain of the active fiber. Therefore, the communications signals arriving at the receiver after the re-establishment of the transmission path, will frequently be below the sensitivity limit of the receiver because of the reduced pump power.

This problem has previously been solved e.g. by using an additional fiber from the receiver to the active fiber. This fiber, in combination with the transmission fiber, is used for passing a control signal from the receiver to the active fiber and back to the receiver. When the control signal is present, there is no break on the fiber and consequently no access to the strong optical pump power, and the pump laser can therefore pump with full power. When, on the other hand, the control signal is absent, this indicates a break on the fiber, involving the risk that the optical power hits an eye, and the pump power is therefore reduced to a safe level until the control signal is present again.

Although this solution is technically adequate, it is vitiated by the serious drawback that it requires an additional fiber typically of a length of 10–50 km. Moreover, a detector or a coupler capable of returning the control signal to the receiver must necessarily be provided at the active fiber.

Systems which are able to reduce the optical output power from a fiber amplifier in case of a broken fiber are also known. These systems do not involve remote-pumped amplifiers and, therefore, they only reduce power of the communications signals because the pump power never leaves the fiber amplifier itself.

Such a system is described in DE 42 22 270 in which the pump power to the active fiber is reduced if an alarm signal is received from the receiver in the other end of a transmission fiber, said alarm signal indicating that the communications signals are not received, e.g. because of a broken fiber. However, this can only be done if there is an extra fiber or another transmission channel for transfer of the alarm signal and, therefore, this system also has the above-mentioned drawback. Further, the system is not suitable for reducing pump power, unless a special detector unit as above is provided at the active fiber for generation of an alarm signal.

A similar system is known from U.S. Pat. No. 5,428,471 in which two parallel fibers are used for transmission in respective directions. When a fiber amplifier in one direction detects an absent input signal a message is sent via the opposite fiber back to the previous fiber amplifier to reduce or shut down its optical power level. Therefore, also this system has the above-mentioned drawbacks.

SUMMARY OF THE INVENTION

The invention provides an optical amplifier of the stated type which, in case of a pump fiber break, is capable of complying with the standards of how much light may be transmitted on the fiber, and which is simultaneously capable of returning to full pump power when the fiber connection has been re-established. This may take place by using the existing fiber or fibers, which means that no additional fiber is required exclusively for this purpose, and that an additional detector or coupler at the active fiber is obviated.

This is achieved according to the invention in that, in a safety state, the pump unit is moreover adapted to give a pulsed pump power whose mean power is lower than a prescribed safety limit.

Pulsing of the pump power ensures that its mean power can be kept so low in the safety state that the emitted light is unharmful to the human eye, while the instantaneous power of the pulses is sufficiently high for the active fiber to respond on reception of these pulses and to inform the pump unit—via the pump fiber or optionally another existing fiber—that the pump fiber is now intact again. When—and if—a pump pulse arrives at the active fiber, the optical power contained in the pulse will be absorbed by the active fiber which, in response to the pulse, simultaneously generates a spontaneous noise called ASE (Amplified Spontaneous Emission), and this ASE signal may then be returned to the pump unit.

The pump unit, which generates the required pump power, may be constructed in different ways. In an expedient embodiment a pump laser is used.

When the pump unit is adapted to detect whether an optical signal is returned from the active fiber in response to the pulsed pump power, it is ensured that the pump unit can switch between the operational state and the safety state in dependence on the returned signal.

When the pump unit is adapted to generate the pulsed pump power as pulses repeated with a given frequency, it is ensured that also the returned ASE noise, in the situation where the pulses arrive at the active fiber, will have this frequency, a corresponding ASE pulse being returned for each emitted pulse. Therefore, the pump unit may expediently be adapted to perform the detection of whether an optical signal is returned from the active fiber in response to the pulsed pump power, by detecting whether an optical signal with the given pulsation frequency is received.

Then, the pump unit may be adapted to remain in the safety state if it is detected that no optical signal is returned from the active fiber in response to the pulsed pump power, and to switch to the operational state if it is detected that such a signal is returned.

Switching from the safety state to the operational state may take place via an intermediate state in which the pump unit can give a continuous pump power superimposed by a pulsed signal. This ensures that in this intermediate state the active fiber may be given a sufficient pump power for it to operate practically normally and therefore to amplify any communications signals, while enabling it to be controlled by means of the pulses whether the connection is still intact until communications signals proper are received. Expediently, as stated in claim 9, the superimposed pulsed signal in the intermediate state may have the same shape as the pulsed pump power in the safety state. As a result, the same detector circuit may be used in the two states.

It will therefore be expedient that optical information signals may moreover be transferred from the active fiber to the pump unit, and that the pump unit comprises means for detecting whether such information signals are received.

A particularly expedient embodiment is obtained when the said optical information signals are transferred from the active fiber to the pump unit via the pump fiber, as the system then just needs one fiber capable of serving as a transmission fiber and pump fiber, and moreover capable, in the safety state, of transferring the pulsed pump power and the possible response to this.

When the pump unit is in the operational state, it may be adapted to remain in this state as long as information signals are received, and to switch to the safety state if no information signals are received.

When the pump unit is in the safety state, it may be adapted to remain in this state if no returned optical signal in response to the pulsed pump power is detected, and to switch to the intermediate state if such a signal is detected.

When the pump unit is in the intermediate state, it may be adapted to switch to the operational state if information signals are received, to switch to the dwell state if no returned optical signal in response to the pulsed pump power is detected, and to remain in the intermediate state if a returned optical signal in response to the pulsed pump power is detected and no information signals are received.

Finally, the pump unit may be adapted to inhibit the detection of whether an optical signal in response to the pulsed pump power is returned from the active fiber, until a selected period of time has elapsed after the transmission of each pulse from the pump unit. This ensures that the detector circuit ignores the reflections that will be returned from the pump fiber, irrespective of whether this is intact or broken, and instead exclusively detects the ASE noise which can only originate from the active fiber, and which will last considerably longer than the reflections from the pump fiber.

As mentioned, the invention also relates to a method of preventing emission of optical power exceeding a prescribed safety limit on interruption of an optical fiber which transfers pump power from a pump unit to an active fiber. When the mean power of the pump power is changed in response to a signal received from the active fiber such that the mean power assumes a value below said safety limit if said signal is not received, and assumes a nominal value if said signal is received, it is ensured that the mean power may automatically be reduced to a safe level when a break occurs on the optical fiber.

This may expediently take place in that the mean power below said safety limit is generated by pulsing the pump power with a given frequency, and that the signal received from the active fiber is detected by detecting whether a signal with the given pulsation frequency is received.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, in which.

DETAILED DESCRIPTION OF THE INVENTION

Figure 1:
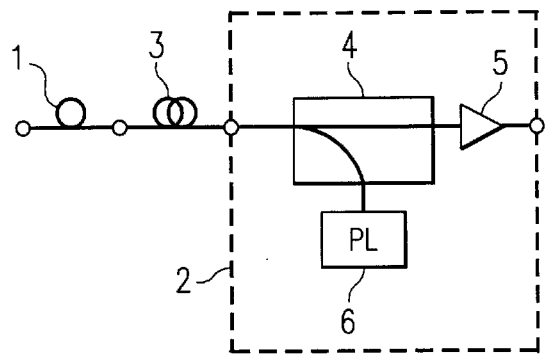
FIG. 1 shows an example of a remote-pumped optical amplifier consisting of an erbium-doped fiber, a receiver and pump unit and a transmission and pump fiber.

FIG. 1 shows an example of an optical remote-pumped amplifier of the invention. The example involves an optical preamplifier consisting of an erbium-doped fiber 1 and a receiver and pump unit 2 connected to the erbium-doped fiber by a transmission and pump fiber 3, which may typically have a length of 10–50 km.

In the receiver and pump unit 2, the light arriving from the fiber 3 passes via a wavelength multiplexer 4 to a receiver or amplifier circuit 5, in which the transmission or information signals contained in the light may be received and optionally be passed on for further processing. A pump laser 6 generates optical pump power which is transmitted via the wavelength multiplexer 4 out on the fiber 3 in a direction toward the erbium-doped fiber 1. Typically, the light with the information signals may have a wavelength of 1550 nm, while oppositely directed pump light may have a wavelength of 1480 nm, thereby enabling the wavelength multiplexer 4 to transmit the information signals from the fiber 3 to the receiver circuit 5 and the pump power from the pump laser 6 to the fiber 3.

The mean power of the pump signal will usually be considerably higher than the mean power of the transmission signals, and interruption of the fiber 3 between the unit 2 and the erbium-doped fiber 1 would therefore involve the risk that a harmful quantity of light might hit an eye if no safety measures were taken.

The receiver and pump unit 2 is therefore adapted to be able to assume three states.

In an operational state assumed when the receiver 5 detects a communications signal, the pump laser gives full nominal pump power, as the received communications signal is a guarantee that the fiber 3 is intact all the way to the erbium-doped fiber 1.

In a safety state assumed when there is no connection from the receiver and pump unit 2 to the erbium-doped fiber 1, the pump signal is pulsed so that its mean power is below 10 mW, which means i.a. that the equipment may be categorized as safety class 1 according to the IEC 825 recommendations.

An intermediate state is assumed when connection to an erbium-doped fiber is detected, while the receiver 5 has not yet detected a communication signal. In this state, the pump power is detected so that the mean power constitutes about ⅔ of the nominal pump power.

If the fiber 3 is intact when the system is in the safety state or the intermediate state, the pump pulses will reach the erbium-doped fiber 1, and the optical power contained in the pulses will be absorbed by the erbium-doped fiber, while a spontaneous noise pulse of so-called ASE noise (Amplified Spontaneous Emission) is generated in response to each pulse in the erbium-doped fiber 1. These ASE noise pulses will then be returned via the fiber 3 to the unit 2, where, as will be described more fully below, they can be detected to indicate that there is no break on the fiber 3.

If, on the other hand, there is a break on the fiber 3, the pulses emitted from the pump laser 6 will not reach the erbium-doped fiber 1, and thus no ASE noise pulses will be generated.

When the system is started, the receiver and pump unit 2 will first assume the safety state, while it is checked whether connection to an erbium-doped fiber has been established. When this has been found to be the case, the unit 2 switches to the intermediate state until the receiver 5 detects a transmission signal. In the intermediate state where the pump power is about ⅔ of the nominal value, the transmission quality is just slightly inferior relative to normal function, and the rest of the system is therefore capable of performing a normal start-up procedure. When the receiver 5 detects a transmission signal, the unit 2 switches to the normal operational state.

Figure 2:
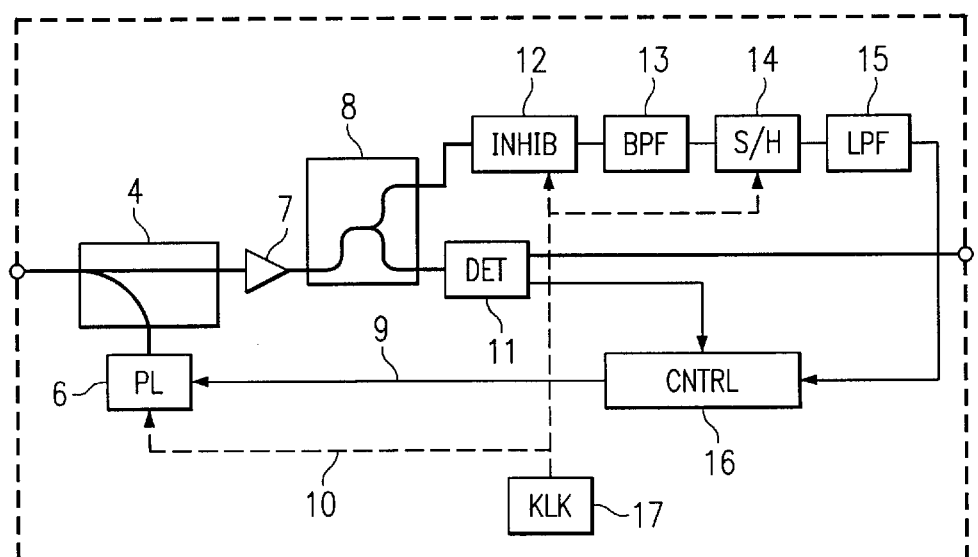
FIG. 2 shows the receiver and pump unit of FIG. 1 in greater detail.

If it is detected at any time while the system is in the operational state that the receiver 5 no longer detects a communications signal, the unit 2 immediately switches to the safety state, as the missing communications signal may, for example, be caused by a fiber break between the unit 2 and the erbium-doped fiber FIG. 2 shows in greater detail how the receiver and pump unit 2 may be constructed. As will be seen, the pump laser 6 is controllable partly from a control unit 16 and partly from a clock generator 17. The control unit 16 decides which of the three above-mentioned states the unit is to assume, while the clock generator 17 determines the pulse frequency in the states where the pump laser is pulsed. The pulse frequency may, for example, be selected at 75 Hz.

Having passed the wavelength multiplexer 4, the light received from the fiber 3 may optionally be amplified in an optical amplifier 7, following which it is split into two branches in the optical coupler 8. The branch having the units 12–15, which will be described more fully below, detects whether the received light includes ASE noise pulses with the pulse frequency, while the detector 11 detects whether the light contains communications signals.

In the operational state, the pump laser 6 pumps continuously with the nominal pump power, and the communications signals received from the fiber 3 reach the detector 11 via the wavelength multiplexer 4, the amplifier 7 and the coupler 8. The detector 11 passes the signals on for further processing and also informs the control unit 16 that communications signals are received at the moment. The control unit 16 therefore ensures that the laser 6 continues to give full pump power.

If the detector 11 detects that the communications signals fail to appear, it informs the control unit 16 which immediately sets the pump laser 6 in the safety state via the connector 9, where the pump power is transmitted in pulses determined by the clock generator 17. The pulsed pump power may, for example, look as shown on curve A in FIG. 3. The repetition frequency of the pulses is here selected to be 75 Hz, and the duty cycle is selected such that the resulting mean power is below 10 mW. Typically, the nominal power will be 110 mW, and the duty cycle will then be 1/11 or less.

When the fiber 3 is intact, the pulses will move along it until they reach the erbium-doped fiber 1, and part of the pulse will be reflected on the way because of Rayleigh scattering, and, therefore, a reflected signal will return to the receiver and pump unit 2 from the fiber 3. This signal may, for example. look as shown on curve B in FIG. 3. It is noted that the amplitude of the reflected signal is considerably smaller than the emitted pulses. When the pump pulse reaches the erbium-doped fiber 1, this will be active and start generating ASE noise, which is likewise passed via the fiber 3 back to the receiver and pump unit 2. The ASE noise will be generated as long as the pulse lasts, and will then decrease according to an exponential curve whose time constant is long with respect to the transmission time on the fiber 3. The ASE noise received on the receiver and pump unit 2 may look as shown on curve C in FIG. 3. These ASE noise pulses are used in the receiver and pump unit 2 as an indication that the fiber 3 is intact.

Since, however, the signal received from the fiber 3 is the sum of curves B and C, the inhibition circuit 12 provides for blocking of the received signal as long as the signal reflected from the fiber 3 lasts (curve B). Because of the pulse transit time in the fiber, this will be a period after the end of the transmitted pump pulse, which will be about 0.5 msec. with a fiber length of 50 km. As mentioned below, a reflected signal will return also if the fiber is broken, but also this signal will at most be of the same duration. The inhibition circuit 12 is also controlled by the clock generator 17. Thus, only the exponential "tail" of the ASE noise pulse will be present on the output of the inhibition circuit 12, as shown on curve D in FIG. 3.

This signal, like the emitted pulses, has a repetition frequency of 75 Hz, and it is now passed through a bandpass filter having a center frequency of the 75 Hz and a bandwidth of e.g. 15 Hz to filter out partly components from a possible communications signal partly signals originating from a constant spontaneous emission in the erbium-doped fiber 1.

The bandpass-filtered signal is then fed to a sample-and-hold circuit 14 which samples with the same frequency as the pulsed pump signal so as to provide a sampling value for each pulse. The sampled values are lowpass-filtered in the lowpass filter 15 and are then compared in the control unit 16 with a threshold value to decide whether a sufficiently great value of the ASE noise is received. If the control unit 16 detects that the ASE noise pulses are above the threshold value, it instructs the pump laser to switch to the intermediate state, which will be described below, as the fiber 3 must be intact.

If, on the other hand, the fiber 3 is broken, no ASE pulses can come from the erbium-doped fiber 1, as the pump pulses do no reach it. But then there will be a strong reflection of the emitted pulse from the break. Depending on the distance from the break, this reflection will usually have a considerably greater amplitude than both curves B and C in FIG. 3; but this reflection will be over at the latest simultaneously with curve B and will therefore be blocked by the inhibition circuit 12, so that the control unit 16 does not detect any signal. This is an indication of a break on the fiber, and the control unit therefore informs the pump laser 6 to remain in the safety state.

Figure 4:
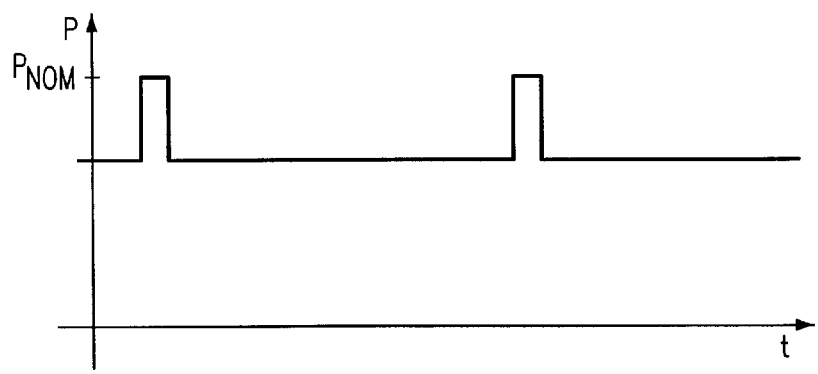
FIG. 4 shows curve shape of a pump signal in the receiver and pump unit when this is in an intermediate state.
Figure 3A:
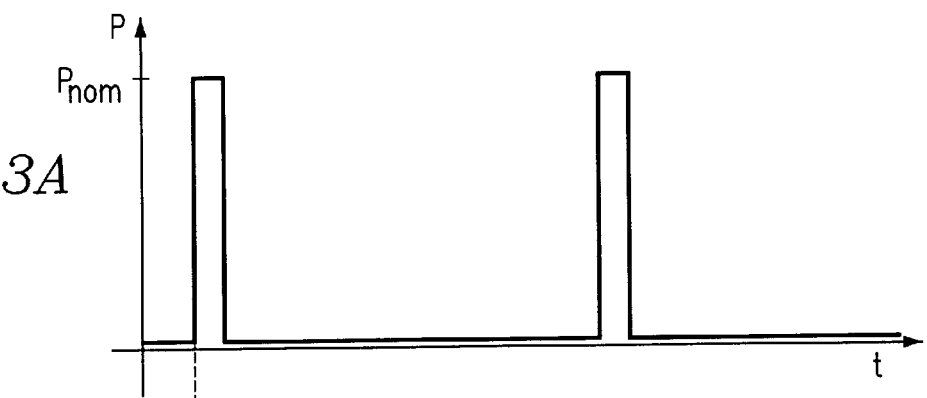
FIGS. 3A–3D show curve shapes of signals in the receiver and pump unit when this is in a safety state.
Figure 3B:
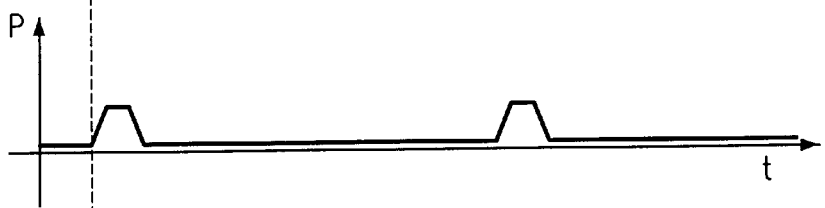
Figure 3C:
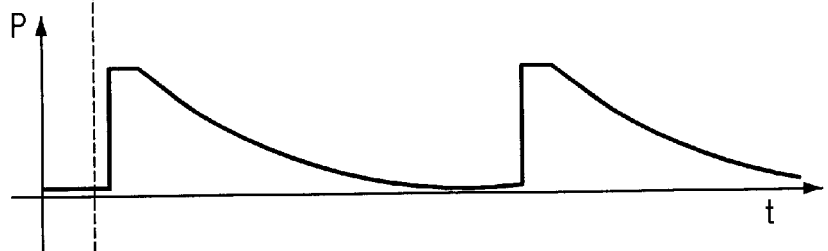
Figure 3D:

When the control unit 16 has established that ASE pulses return, the unit switches to the intermediate state, as mentioned, where the pump laser emits a signal, as shown in FIG. 4. The power level between the pulses is selected at about ⅔ of the nominal pump power, and the peak level of the pulses corresponds to the nominal power.

If the fiber 3 is still intact, a signal corresponding completely to the one described above and shown in FIG. 3 will be returned, the amplitude of the signals being merely smaller. The difference is just that the erbium-doped fiber 1 will now receive sufficient pump power to make it capable of passing on communications signals. When these are detected by the detector 11, the control unit switches to the normal operational state. The intermediate state is necessary, because the operational state can only be maintained when communications signals are received. Therefore, in this circuit, it will not be expedient to switch directly from the safety state to the operational state.

If the ASE pulses disappear in the intermediate state, this indicates that the fiber has been interrupted again, and the control unit 16 will therefore return to the safety state.

The repetition frequency of the emitted pulses is here selected at 75 Hz; but may also assume other values of course. It must be sufficiently low so that the next ASE pulse is not emitted before the ASE pulse caused by the pulse has died away, and the lower limit of the frequency is determined by the maximum time it may take the system to switch from the intermediate state to the safety state.

What is claimed is:

1. An optical amplifier, comprising:
a receiver and pump unit operable to receive optical signals from a fiber optic link, the receiver and pump unit operable to convert the optical signals into communication information, the receiver and pump unit operable to transmit the communication information, the receiver and pump unit operable to provide optical pump power to the fiber optic link, the receiver and pump unit operable to operate in a safety state in response to determining that no optical signal is present on the fiber optic link, the receiver and pump unit operable to operate in an intermediate state in response to determining that an optical signal is present on the fiber optic link, the receiver and pump unit operable to operate in an operational state in response to determining that an optical signal is present on the fiber optic link and the optical signal carries communication information.

2. The optical amplifier of claim 1, wherein the receiver and pump unit includes a pump laser for generating the optical pump power.

3. The optical amplifier of claim 1, wherein the receiver and pump unit is operable to detect whether an optical signal is returned in response to the optical pump power.

4. The optical amplifier of claim 1, wherein the receiver and pump unit is operable to generate the optical pump power as pulses which are repeated with a given frequency.

5. The optical amplifier of claim 4, wherein the receiver and pump unit is operable to detect whether an optical signal having the given frequency is returned from the fiber optic link in response to the optical pump power.

6. The optical amplifier of claim 3, wherein the receiver and pump unit is operable to remain in the safety state if it is detected that no optical signal is returned in response to the optical pump power.

7. The optical amplifier of claim 3, wherein the receiver and pump unit is operable to switch to the operational state if it is detected that an optical signal is returned in response to the optical pump power.

8. The optical amplifier of claim 7, wherein the receiver and pump unit is operable to switch from the safety state to the operational state via the intermediate state, the receiver and pump unit operable to give a continuous optical pump power super-imposed by a optical signal in the intermediate state.

9. The optical amplifier of claim 8, wherein the super-imposed optical signal in the intermediate state has the same shape as the optical pump power in the safety state.

10. The optical amplifier of claim 7, wherein the receiver and pump unit remains in the operational state as long as communication information carried by optical signals are received.

11. The optical amplifier of claim 10, wherein the receiver and pump unit is operable to switch to the safety state if no optical signals are received.

12. The optical amplifier of claim 3, wherein the receiver and pump unit is operable to switch to the intermediate state in response to detection of an optical signal.

13. The optical amplifier of claim 12, wherein the receiver and pump unit, when in the intermediate state, is operable to switch to the operational state if optical signals are received carrying communication information.

14. The optical amplifier of claim 13, wherein the receiver and pump unit is operable to switch to the safety state if no optical signals are received.

15. The optical amplifier of claim 13, wherein the receiver and pump unit is operable to switch to the intermediate state in response to receiving optical signals that do not carry communication information.

16. The optical amplifier of claim 3, wherein the receiver and pump unit is operable to inhibit detection of whether an optical signal is returned in response to the optical pump power until a selected period of time has elapsed after the emission of each pulse of the optical pump power from the receiver and pump unit.

17. A method of controlling power on an optical fiber, comprising:

generating an optical pump power;

transmitting the optical pump power;

determining whether an optical signal has been received;

operating in a steady state in response to no optical signal being received;

operating in an intermediate state in response to receiving an optical signal;

operating in an operational state in response to receiving the optical signal and in response to communication information being carried by the optical signal.

18. The method of claim 17, further comprising:

setting the mean power of the optical pump power below a desired safety level in response to no optical signal being received;

increasing the mean power of the optical pump power to a subnominal level in response to receipt of the optical signal.

19. The method of claim 18, further comprising:

determining whether the optical signal carries communication information;

increasing the mean power of the optical pump power to a nominal level in response to receipt of communication information.

20. An optical amplifier, comprising:

means for generating an optical pump power;

means for transmitting the optical pump power;

means for determining whether an optical signal has been received;

means for operating in a steady state in response to no optical signal being received;

means for operating in an intermediate state in response to receiving an optical signal;

means for operating in an operational state in response to receiving the optical signal and in response to communication information being carried by the optical signal.

* * * * *